United States Patent [19]

Hahn et al.

[11] Patent Number: 4,512,395
[45] Date of Patent: Apr. 23, 1985

[54] MULTIPLE HEAT EXCHANGER DISTRIBUTION APPARATUS

[75] Inventors: Granville J. Hahn; Raleigh N. Rutledge, both of Big Spring, Tex.

[73] Assignee: Cosden Technology, Inc., Dallas, Tex.

[21] Appl. No.: 538,077

[22] Filed: Oct. 3, 1983

[51] Int. Cl.³ .............................................. F28F 27/02
[52] U.S. Cl. .................................. 165/101; 137/625.3; 137/625.38
[58] Field of Search ......................... 137/625.3, 625.38; 165/101

[56] References Cited

U.S. PATENT DOCUMENTS 1,912,670  6/1933  Trumble et al. ..................... 137/601
3,047,274  7/1962  Wilson ............................. 165/101 X Primary Examiner—Allen M. Ostrager
Attorney, Agent, or Firm—Robert H. Sproule; Roy L. Van Winkle

[57] ABSTRACT

Disclosed is a multiple heat exchanger system utilizing an inlet manifold to distribute the flow of thermoplastic material from an extruder to the inlet ends of each of the heat exchangers, and a discharge manifold to converge the flow of thermoplastic material from the discharge ends of each of the heat exchangers and to direct the flow to an extrusion die. The inlet and outlet manifolds include a main port in communication with a plurality of passageways within the manifold to allow flow between a main conduit in communication with the main port and a plurality of distribution conduits in communication with each of the heat exchangers. A flow control means positioned at each distribution port includes a sleeve, having a flow space therethrough, axially aligned within both the distribution port and distribution conduit. The distribution conduit includes a plurality of orifices about the circumference thereof in communication with the heat exchanger for the flow of thermoplastic material. The sleeve includes a plurality of flow control orifices about the circumference thereof for the flow of thermoplastic therethrough. Communication of varying portions of the sleeve flow orifices with the distribution orifices by axial movement of the sleeve regulates the flow of thermoplastic material into and out of the heat exchanger.

14 Claims, 6 Drawing Figures

MULTIPLE HEAT EXCHANGER DISTRIBUTION APPARATUS

BACKGROUND OF THE INVENTION

The present invention relates to apparatus for regulating the flow of thermoplastic material between a main conduit and a plurality of distribution conduits. More particularly, the present invention relates to an apparatus for regulating the flow of thermoplastic material between a main conduit and a plurality of heat exchangers.

The use of a heat exchanger to control the temperature of heated polymer is well known in the art. Heat exchangers were used downstream of an extruder to accurately control the temperature of the extruded polymer prior to entering a multi-layer extrusion die in U.S. Pat. No. 4,362,482 by Rutledge.

It has been found, however, that a single heat exchanger is unable to cool heated polymer at a sufficient rate to allow higher throughputs of polymer required in some commercial operations. The construction of larger heat exchangers to handle the higher throughputs results in greatly increased costs due to the amount of material required to insure the structural integrity of the larger heat exchanger. Instead of increasing the size of the single heat exchanger it would be desirable to increase the number of heat exchangers to cool the heated polymer and thereby allow increased rates of throughput. The use of multiple heat exchangers requires distribution of the flow of heated polymer to the heat exchangers, and then reconvergence of the flow of cooled polymer to enter the extrusion die. In addition, the temperature requirements for extruding certain polymers are extremely narrow, requiring temperature control across the polymer as low as $\pm 1°$. There is required therefore apparatus for maintaining uniform cooling of the polymer within precise temperature limitations.

SUMMARY OF THE INVENTION

There is provided in accordance with the present invention, apparatus for regulating the flow of thermoplastic material between a main conduit and a plurality of distribution conduits. The apparatus comprises a manifold having a main port in communication with the main conduit, and a plurality of distribution ports; each of said distribution ports being in communication with one of the distribution conduits. The main port is in communication with each distribution port through passageways within the manifold. The apparatus also includes means for regulating the flow of thermoplastic material through each of the distribution ports. Each of the regulating means includes a sleeve, having a flow space therethrough, axially aligned within both the distribution port and the distribution conduit for axial movement. The distribution conduit includes a plurality of orifices through its surface for the flow of thermoplastic material. The sleeve includes a main orifice through its surface which communicates or joins the manifold passageway with the flow space of the sleeve. The sleeve also includes a plurality of flow orifices through its surface for the flow of thermoplastic material. The flow of thermoplastic material through the distribution port is regulated by communication of varying portions of the sleeve orifices with the conduit orifices by axial positioning of the sleeve. In addition, the apparatus also includes means for moving the sleeve in an axial direction. This sleeve moving means comprises a housing positioned at one end of the sleeve, and a member threadably engaged by the housing. The member engages the sleeve such that rotation of the member within the housing causes axial movement of the sleeve to communicate varying portions of the sleeve orifice with the manifold passageway.

In one embodiment of the invention there is provided apparatus for regulating the flow of thermoplastic material between a main conduit and a plurality of heat exchangers which control the temperature of thermoplastic material flowing through a chamber within each of the heat exchangers. The apparatus comprises a manifold having a main port in communication with the main conduit, and a plurality of distribution ports each in communication with one of the heat exchangers through a distribution conduit. The main port is in communication with each of the distribution ports through passageways within the manifold. Also included are means for regulating the flow of thermoplastic material through each of the distribution ports. Each of the flow regulating means includes a sleeve, having a flow space therethrough, axially aligned within both the distribution port and the distribution conduit for axial movement. The distribution conduit includes a plurality of orifices through its surface communicating the manifold passageway with the flow space of the sleeve. The sleeve includes a main orifice through its surface joining the manifold passageway with the distribution conduit and a plurality of flow orifices through its surface for the flow of thermoplastic material. The flow of thermoplastic material through the distribution port is regulated by communication of varying portions of the sleeve orifices with the conduit orifices by axial positioning of the sleeve.

In another embodiment of the present invention there is disclosed a system for controlling the temperature of molten thermoplastic material. The system comprises an inlet manifold having a main port in communication with a first main conduit which receives the thermoplastic material through it. The inlet manifold also includes a plurality of inlet distribution ports, each of which communicates with the main port through passageways within the inlet manifold. Also included is a discharge manifold having a main port in communication with a second main conduit which discharges thermoplastic material through it. The discharge manifold has a plurality of discharge distribution ports, each of which communicates with the main port through passageways within the discharge manifold. In addition, there are a plurality of heat exchangers for controlling the temperature of the thermoplastic material; each heat exchanger having a chamber for the flow of thermoplastic material through it. Each heat exchanger has an inlet conduit in communication with one of the inlet distribution ports and an outlet conduit in communication with one of the discharge distribution ports. This embodiment also includes means for regulating the flow of thermoplastic material through each distribution port. The flow regulating means includes a sleeve, having a flow space through it, axially aligned within both the distribution port and the distribution conduit for axial movement. The distribution conduit includes a plurality of orifices through its surface in communication with the flow chamber for the flow of thermoplastic material. The sleeve includes a main orifice communicating the manifold passageway with the flow space of the sleeve and a plurality of orifices for the flow of thermoplastic material. The flow of thermoplastic material is regulated by communicating varying portions of the sleeve orifices with the conduit orifices by axial positioning of the sleeve.

DETAILED DESCRIPTION OF THE INVENTION

Figure 1:
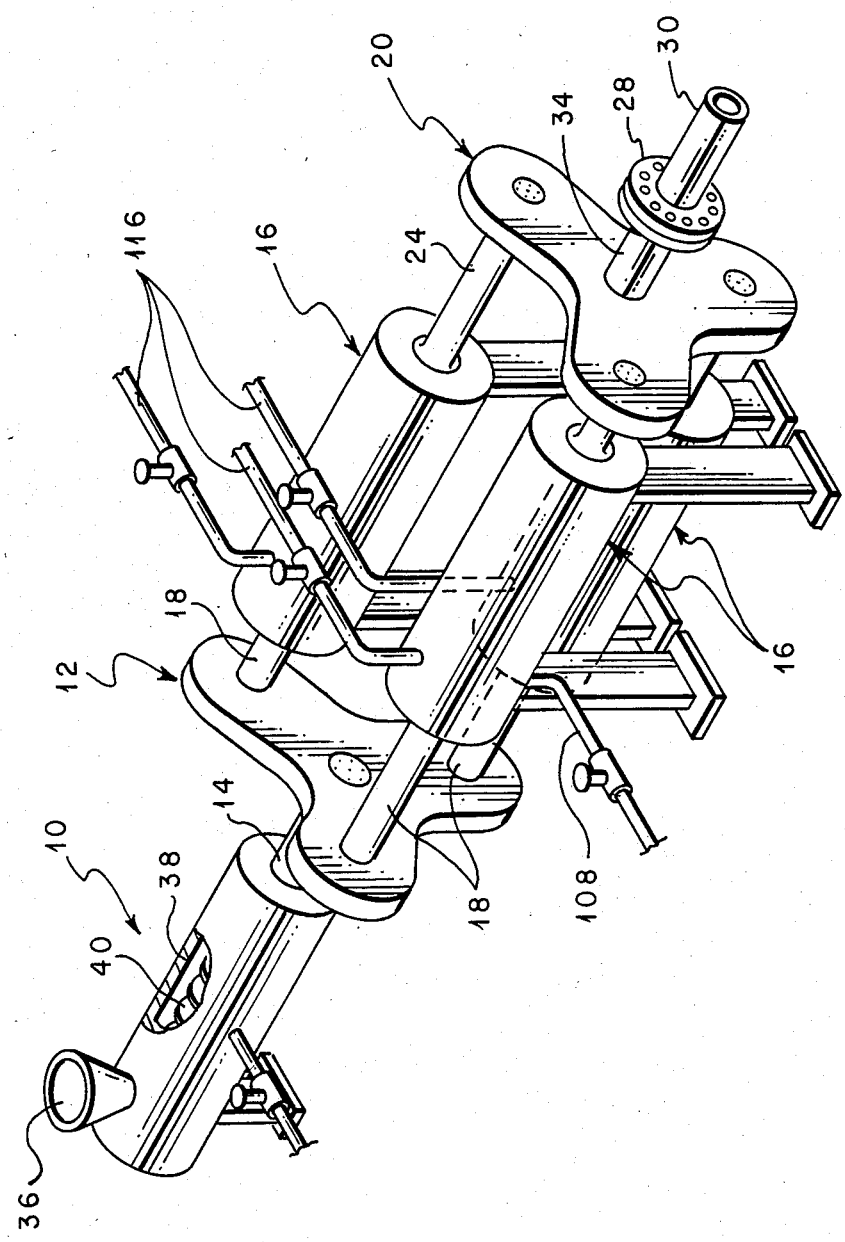
FIG. 1 is a perspective view of a multiple heat exchanger cooling system disposed between an extruder and a pipe die.

Referring to FIG. 1, there is illustrated a multiple heat exchanger extrusion system comprising an extruder 10; an inlet distribution manifold 12 connected downstream of extruder 10 by conduit 14; three heat exchangers 16 connected downstream of inlet distribution manifold 12 by conduits 18; a discharge distribution manifold 20 connected downstream of heat exchangers 16 by conduits 24; and a die 28 for the extrusion of pipe 30 connected downstream of outlet manifold 20 by conduit 34.

Extruder 10 is a conventional motor driven, single stage, screw-type extruder of the type which is commercially available and well known to those of ordinary skill in the art. As shown in FIG. 1 extruder 10 typically comprises a barrel 38 having extruder screw 40 positioned therein in such manner that extruder screw 40 is rotatable about its longitudinal axis. As the thermoplastic composition moves from thermoplastic feed chute 36 along extruder screw 40, the components therein are mixed, blended, and subjected to shear and compressive forces which tend to heat the composition, forming it into a substantially homogeneous, continuous flowable mass. As the thermoplastic composition reaches the downstream end of the extruder screw 40, it is forced through conduit 14 into inlet distribution manifold 12.

The thermoplastic resins for use in the process of the invention are selected from the group consisting of both crystalline and amorphous polymers. Preferred thermoplastic resins for use in the present invention include polystyrene, polyvinyl chloride, acrylonitrile-butadiene-styrene (ABS), polyethylene, polypropylene, polyesters, terephthalates, and the like. It should be appreciated that various other copolymers and terpolymers of the above mentioned crystalline and amorphous polymers can also be employed in the present invention.

Figure 2:
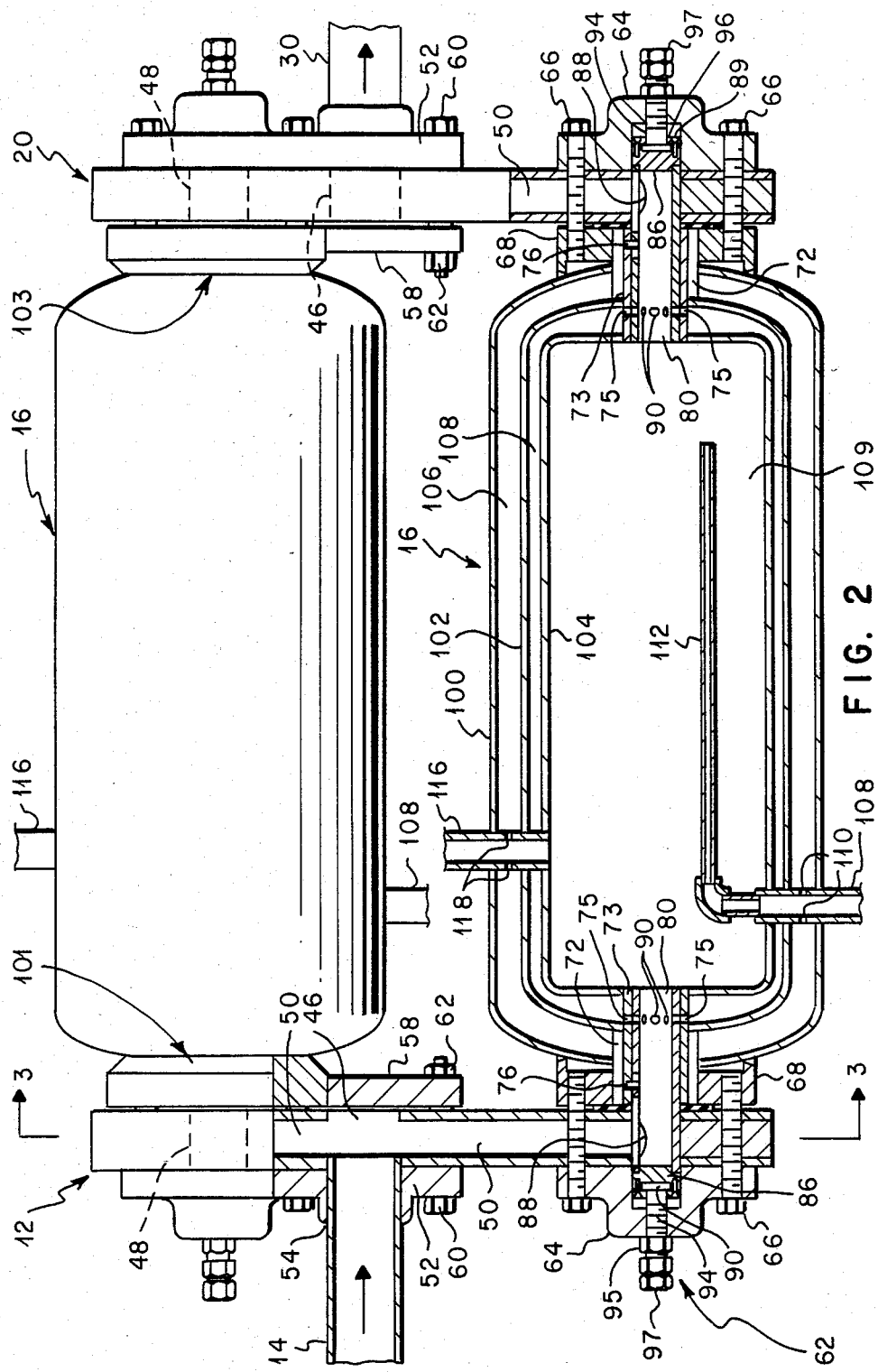
FIG. 2 is a longitudinal sectional view of a heat exchanger and a partial sectional end view of an inlet and outlet distribution manifold connected to the inlet and the outlet ends of the heat exchanger respectively.
Figure 3:
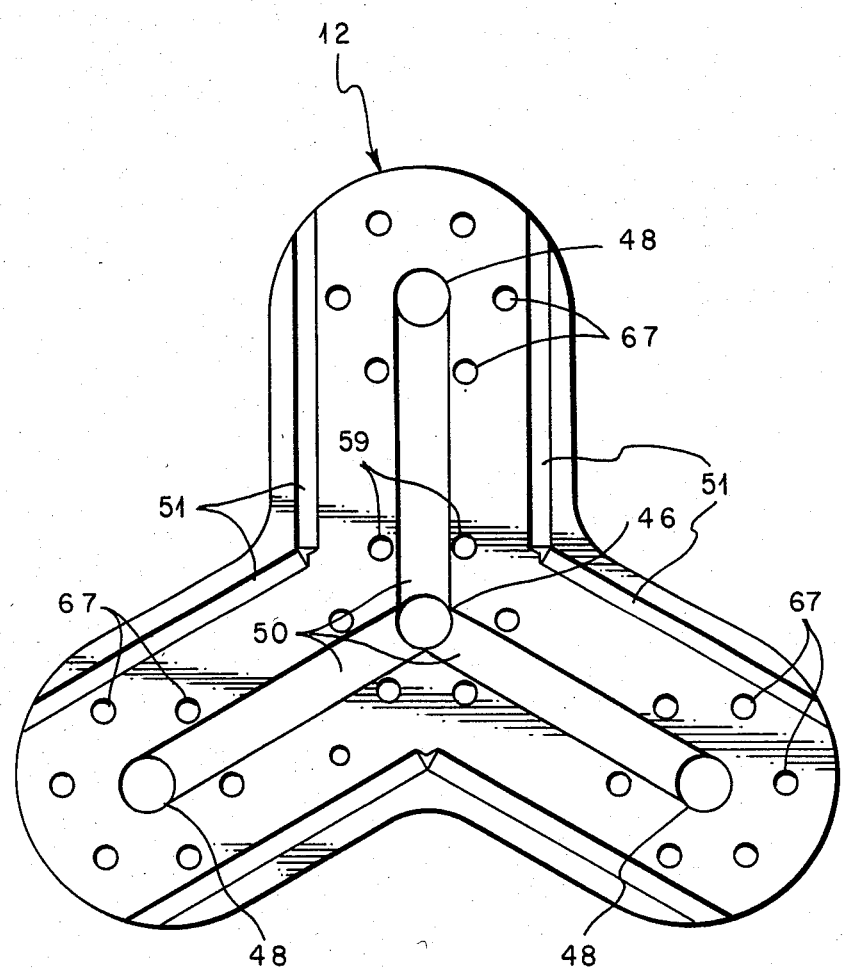
FIG. 3 is a cross-sectional view of the distribution manifold taken along line 3—3 of FIG. 2.
Figure 4:
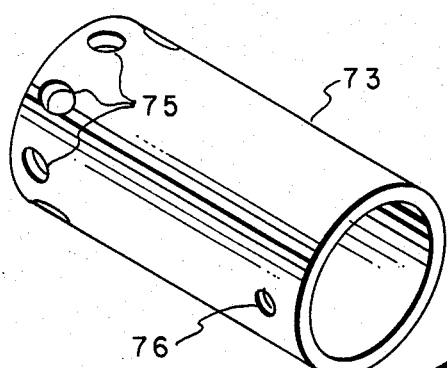
FIG. 4 is a perspective view of the outer distribution sleeve.

Referring now to FIG. 2, inlet distribution manifold 12 is shown in greater detail. It should be appreciated that inlet distribution manifold 12 and outlet distribution manifold 20 may be identical in design for positioning at opposite ends of heat exchanger 16. Therefore, the description of inlet manifold 12 will also generally apply to outlet manifold 20, and the numbers used to identify elements of inlet manifold 12 will also be used to identify identical elements of discharge manifold 20. Inlet manifold 12 includes inlet distribution port 46 located in proximity to the center of manifold 12 and in communication with inlet conduit 14 for the receipt of thermoplastic material. Referring now to FIGS. 2 and 3, passageways 50 enclosed within manifold 12 communicate main inlet port 46 with inlet distribution ports 48 located radially outward from inlet port 46 and axially perpendicular to the plane of inlet manifold 16. Manifold 12 includes a plurality of receptacles 51 for the receipt of electrically resistive heater cartridges (not shown) positioned parallel to passageways 50. The heater cartridges are used to initially heat any cooled thermoplastic material left in the manifold 12 from previous operations and which plugs the manifold passageways if left in the cooled state. The heater cartridges are commercially available and selected for the desired wattage, voltage and length. Flange 52 includes a bore 54 mated with conduit 14 to secure conduit 14 to manifold 12. Flange 58, positioned at the opposite side of manifold 12 from flange 52, covers inlet distribution port 46 to prevent the escape of thermoplastic material therefrom. Flanges 52, 58 are secured to manifold 12 through holes 59 by bolts 60 and nuts 62.

Figure 5:
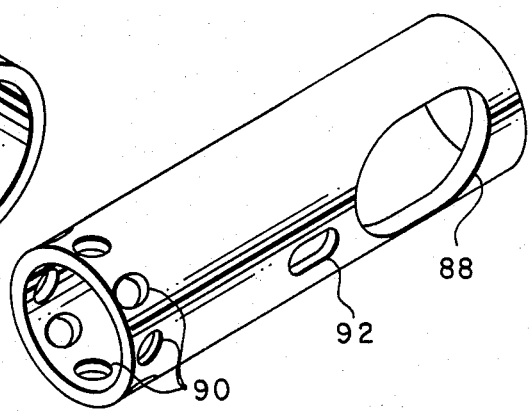
FIG. 5 is a perspective view of the inner distribution sleeve.

Still referring to FIGS. 2 and 3, means indicated at 62 for regulating the flow of thermoplastic material through distribution port 48 comprises a housing 64 secured to manifold 12 by bolts 66 through holes 67 which threadably engage a positioning flange 68 at the opposite side of manifold 12 from housing 64. Positioning flange 68 includes a central bore 70 having mated therein an outer conduit 72 extending perpendicular to the plane of manifold 12. Axially aligned within conduit 72 and affixed thereto is an outer sleeve 73. A portion of the outer sleeve extends beyond conduit 72 and includes a plurality of flow orifices 75 disposed circumferentially about outer sleeve 73 for the discharge of thermoplastic material therethrough (FIG. 5). Outer sleeve 73 includes an orifice 76 inboard of flow orifices 75 for the receipt of a roller pin (not shown).

Figure 6:
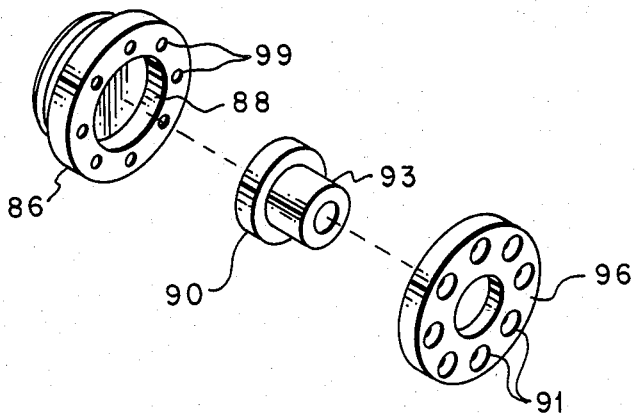
FIG. 6 is an exploded perspective view of the sleeve adjusting means.

Referring now to FIGS. 2 and 6, axially aligned with and slidably engaged within outer sleeve 73 and distribution port 48 is an inner sleeve 80 for axial movement therein. Inner sleeve 80 includes a cap 86 attached to the end thereof. Cap 86 includes a receptacle 88 for the receipt of a foot 90. Foot 90 includes a stem 93 counterbored to anchor the end of bolt 94 therein. Retainer ring 96 secures foot 90 within receptacle 88 by bolts 89 through holes 91 engaging threaded holes 99. Foot 90 is secured within receptacle 88 in a manner to permit rotational movement of foot 90 with adjusting bolt 94. Adjusting bolt 94 is threadably engaged by housing 64 such that rotation of bolt 94 causes axial movement of sleeve 80 within outer sleeve 73 and distribution port 48. Bolt 94 is secured to housing 64 by locking nut 95. A nut 97 is positioned at the head of bolt 94 to receive a tool for rotational adjustment thereof.

Referring now to FIGS. 2 and 5, inner sleeve 80 includes a main orifice 88 at one end thereof in communication with passageway 50 to allow flow of thermoplastic material from passageway 50 into sleeve 80. Main orifice 88 is elongated along the longitudinal axis of inner sleeve 80 such that orifice 88 remains in communication with passageway 50 after axial repositioning of sleeve 80. Inner sleeve 80 also includes flow control orifices 90 circumferentially disposed about the opposite end thereof from main orifice 88 to allow thermoplastic material to exit from sleeve 80 when flow control orifices 90 are in communication with flow orifices 75 of outer sleeve 73. Flow control orifices 90 preferably have the same diameter as flow orifices 75. It should be appreciated therefore that the flow of thermoplastic material through inner sleeve 80 may be controlled by axial movement of inner sleeve 80 to communicate a portion of flow control orifices 90 with flow orifices 75 of outer sleeve 73. As flow control orifices 90 are moved in a direction toward axial alignment with flow orifices 80, a larger space is provided for the flow of thermoplastic material such that maximum flow is permitted when orifices 75 and 90 are in axial alignment. On the other hand, flow of thermoplastic material may be stopped when inner sleeve 80 is repositioned such that flow control orifices 90 are no longer in communication with flow orifices 75.

Sleeve 80 also includes an orifice 92 for the receipt of a roller pin (not shown) inserted through orifice 76 of outer sleeve 75. Slot 76 is elongated along the longitudinal axis of sleeve 80 so that when the roller pin is inserted therein, axial movement of sleeve 80 is permitted while at the same time preventing rotational movement of sleeve 80 due to the rotational force imparted to it by bolt 94. This allows flow control orifices 90 to be easily aligned with flow orifices 76.

In one embodiment of the present invention illustrated in FIG. 2, a positioning flange 68 is welded to an inlet end 101 of heat exchanger 16. Heat exchanger 16 may comprise a standard heat exchanger known in the art for controlling the temperature of a thermoplastic material. It is preferred, however, that the heat exchanger described in Applicants' co-pending application Ser. No. 503,008 filed June 10, 1983 which is hereby incorporated herein by reference, be utilized in the present invention. The heat exchanger 16 comprises three concentrically and co-axially positioned cylindrical vessels identified as outer vessel 100, intermediate vessel 102 and inner chamber 104. Intermediate vessel 102 is concentrically positioned within outer vessel 100 to define an annular concentric flow chamber 106 therebetween for the flow of heat exchange medium therethrough. Inner vessel 104 is concentrically positioned within intermediate vessel 102 to define a flow space 108 therebetween for the flow of a thermoplastic material therethrough. The inside of inner vessel 104 includes various baffle elements and flow control devices (not shown) to direct the flow of the heat exchange medium therewithin. Heat exchanger 16 also includes an inlet pipe 108 having orifices 110 for the flow of heat exchange medium into chamber 106, and an extension pipe 112 in communication with the inside of inner vessel 104 for the flow of heat exchange medium therethrough. A discharge pipe 116 communicates with inner chamber 109 for the flow of heat exchange medium therethrough. Also included in discharge pipe 116 are orifices 118 for the discharge of heat exchange medium from outer chamber 106. Further details regarding the operation of the heat exchanger may be found in the incorporated application above.

Outer conduit 72 is joined to the end of heat exchanger 16 approximately perpendicular thereto such that the end of the conduit 80 abuts intermediate vessel 102. Outer sleeve 73 is axially aligned within conduit 72 and affixed thereto such that the end of sleeve 73 abuts inner vessel 104 to place flow orifices 90 in communication with flow chamber 106. Inner sleeve 80 is slidably engaged within outer sleeve 75 for axial movement therein as described previously.

In a further embodiment of the present invention illustrated in FIGS. 1 and 2, a heat exchanger system for controlling temperature of thermoplastic material is disclosed, comprising a plurality of heat exchangers 16 in communication with inlet manifold 12 at the inlet end 101 of heat exchanger 16. The heat exchangers 16 are in communication with discharge manifold 20 at the discharge end 103 of heat exchangers 16. It is preferred that the multiple heat exchanger system comprise three heat exchangers each in communication with an inlet manifold 12 through an inlet distribution port 48, and each in communication with a discharge manifold 20 through a discharge port 48. It should be appreciated that in the present invention, additional heat exchangers may be incorporated, however, it is believed that a three exchanger system is sufficient to provide the desired throughput of thermoplastic material.

Referring to FIGS. 1 and 2, operation of the system proceeds as follows. Thermoplastic melt from extruder 10 enters manifold 12 through conduit 14 where it is distributed to inlet distribution ports 48 through passageways 50.

The flow of thermoplastic material continues through main orifice 88 and inner sleeve 80 before exiting orifices 90 and 75 into heat exchanger flow chamber 108. Flow continues through flow chamber 108 wherein cooling takes place due to the contradirectional flow of the heat exchange medium entering the heat exchanger 16 through inlet pipe 108 and exiting through discharge pipe 116. Flow of the thermoplastic material continues through heat exchangers 16 to the discharge end 103 thereof before entering discharge manifold 20 and orifices 75 and 90 in communication therewith and into inner sleeve 80. Flow continues through inner sleeve 80, exiting through main orifice 88 into manifold passageways 50, main discharge conduit 34, and through die 28.

The flow of thermoplastic material may be controlled by the discharge rate from extruders 10. It should be appreciated that at the inlet end 101 of heat exchanger 16 flow control orifices 90 must be in communication with flow orifices 75 to allow flow of thermoplastic material into heat exchanger 16. Likewise, flow control orifices 90 must be in alignment with flow orifices 75 at the outlet end 103 to allow discharge of thermoplastic material from flow chamber 108 through discharge sleeve 80.

Orifices 75 and 90 are distributed uniformly around the circumference of outer sleeve 73 and inner sleeve 80, respectively, to insure that the thermoplastic material is metered uniformly into intermediate flow chamber 108 about its entire entrance circumference, about its entire entrance circumference, and then uniformly converged again through orifices 75 and 90 at the discharge end 103. Although not wishing to be bound by theory, it is believed that orifices 75 and 90 cause turbulent flow of the thermoplastic material during passage therethrough. The turbulent flow causes mixing of the thermoplastic material as it enters and exits the heat exchanger 16, thereby providing homogenization of the heated polymer as well as increased transfer of heat from the thermoplastic material to the heat exchange medium. Orifices 75 and 90 are intended to alleviate the problems which occur when the temperature of the thermoplastic in an arcuate portion of the flow annulus is lower than the remaining thermoplastic material resulting in an increased viscosity and a corresponding decrease in the flow velocity for that arcuate portion. Differences in viscosity in various arcuate portions of the flow annulus due to the temperature variations in the thermoplastic creates imperfections in the final product. It has been found that when orifices 75 and 90 are removed from the heat exchanger 16, widely varying temperatures occur in the thermoplastic material exiting the heat exchanger, indicating that channelling or some other similar undesirable effect is occurring. The orifices 75 and 90 alleviate these temperature variations in the thermoplastic.

As mentioned previously, inner sleeve 80 is axially adjustable within outer sleeve 73. Flow control orifices 75 and 90 at the discharge end 103 may be adjusted such that the flow path for thermoplastic material therethrough is larger than the flow path for thermoplastic material at the inlet end 101. Flow path is defined as the total area available for the flow of thermoplastic material through orifices 75 and 90 at either the inlet end 101 or discharge end 103. This slight increase in flow path at the discharge end 103 is sufficient to create a uniform flow upstream of orifices 75 and 90 at inlet end 101, thereby promoting uniform mass flow of the thermoplastic composition. A larger flow path at discharge end 103 is also needed because of the increase in viscosity of the melt resulting from its cooling as it moves through the heat exchanger 16. In addition, changing the size of the flow path by axial movement of sleeve 80 changes the pressure drop across the orifices 75, 90 at inlet end 101 and discharge end 103. An increase in the pressure drop promotes mixing of thermoplastic therein to insure efficient heat exchange through heat exchanger 16.

Although several specific embodiments of the present invention have been described in the detailed description above, this description is not intended to limit the invention to the particular form or embodiments disclosed herein since they are to be recognized as illustrative rather than limitative, and it will be obvious to those skilled in the art that the invention is not so limited. Thus, the invention is declared to cover all changes and modifications of the specific embodiments of invention herein disclosed for purposes of illustration which do not constitute departures from the spirit and the scope of the invention.

The embodiments of the invention in which an exclusive property or privilege is claimed are defined as follows:

1. Apparatus for regulating the flow of thermoplastic material between a main conduit and a plurality of distribution conduits, comprising:
   (a) a manifold having a main port in communication with the main conduit and a plurality of distribution ports each in communication with one of the distribution conduits, the main port in communication with the distribution ports through passageways within the manifold; and
   (b) means for regulating the flow of thermoplastic material through each of the distribution ports including:
      (i) a sleeve, having a flow space therethrough, axially aligned within both the distribution port and the distribution conduit for axial movement therewithin, the distribution conduit including a plurality of orifices through the surface thereof for the flow of thermoplastic material, the sleeve including a main orifice through the surface thereof for communicating the manifold passageway with the flow space of the sleeve and a plurality of flow orifices through the surface thereof for the flow of thermoplastic material, the flow of thermoplastic material through the distribution port regulated by communication of varying portions of the sleeve orifices with the conduit orifices by axial positioning of the sleeve; and
      (ii) means for moving the sleeve in an axial direction.

2. The apparatus of claim 1 wherein the sleeve moving means comprises:
   (a) a housing positioned at one end of the sleeve; and
   (b) a member threadably engaged by the housing, the member engaging the sleeve such that rotation of the member within the housing causes axial movement of the sleeve.

3. The apparatus of claim 1 wherein:
   (a) the main port is centrally disposed within the manifold; and
   (b) the distribution ports are radially disposed from the central port.

4. The apparatus of claim 3 wherein the main port and the distribution ports are axially disposed perpendicular to the plane of the manifold.

5. The apparatus of claim 6 wherein:
   (a) the conduit orifices are circumferentially disposed about the conduit; and
   (b) the sleeve orifices are disposed circumferentially about the sleeve.

6. Apparatus for regulating the flow of thermoplastic material between a main conduit and a plurality of heat exchangers for controlling the temperature of thermoplastic material flowing through chambers therein, comprising:
   (a) a manifold having a main port in communication with the main conduit and a plurality of distribution ports each in communication through a distribution conduit with one of the heat exchangers, the main port in communication with the distribution ports through passageways within the manifold; and
   (b) means for regulating the flow of thermoplastic material through each of the distribution ports, the means including a sleeve, having a flow space therethrough, axially aligned within both the distribution port and the distribution conduit for axial movement therewithin, the distribution conduit including a plurality of orifices through the surface thereof in communication with the flow chamber for the flow of thermoplastic material therethrough, the sleeve including a main orifice through the surface thereof communicating the manifold passageway with the flow space of the sleeve and a plurality of flow orifices through the surface thereof for the flow of thermoplastic material, the flow of thermoplastic material through the distribution port regulated by communication of varying portions of the sleeve orifices with the conduit orifices by axial positioning of the sleeve.

7. The apparatus of claim 6 additionally comprising means for moving the sleeve in an axial direction including:
   (a) a housing positioned at one end of the sleeve, and
   (b) a member threadably engaged by the housing, the member engaging one end of the sleeve such that rotation of the member within the housing causes axial of the sleeve.

8. The apparatus of claim 6 wherein:
   (a) the conduit orifices are circumferentially disposed about the conduit; and (b) the sleeve orifices are disposed circumferentially about the sleeve.

9. The apparatus of claim 6 wherein:
(a) the main port is centrally disposed within the manifold; and
(b) the distribution ports are radially disposed from the central port.

10. The apparatus of claim 9 wherein the longitudinal axis of the main port and the distribution ports are disposed perpendicular to the plane of the manifold.

11. A system for controlling the temperature of thermoplastic material, comprising:
(a) an inlet manifold including a main port in communication with a first main conduit which receives thermoplastic material therethrough and a plurality of inlet distribution ports, the main port in communication with the inlet distribution ports through passageways within the manifold;
(b) a discharge manifold having a main port in communication with a second main conduit which discharges thermoplastic material therethrough and a plurality of discharge distribution ports, the main port in communication with the discharge distribution ports through passageways within the discharge manifold;
(c) a plurality of heat exchangers for controlling the temperature of the thermoplastic material, each heat exchanger having
  (i) an inlet conduit in communication with one of the inlet distribution ports,
  (ii) an discharge conduit in communication with one of the discharge distribution ports, and
  (iii) a chamber for the flow of thermoplastic material therethrough; and
(d) means for regulating the flow of thermoplastic material through each inlet and each discharge port, the means including an inlet sleeve, having a flow space therethrough, axially aligned within both the inlet port and the inlet distribution conduit for axial movement therewithin, the means also including a discharge sleeve, having a flow space therethrough, axially aligned within both the discharge port and the discharge distribution conduit for axial movement therewithin, the inlet distribution conduit and the discharge distribution conduit each including a plurality of orifices through the surface thereof in communication with the flow chamber for the flow of thermoplastic material therethrough, each sleeve including a main orifice through the surface thereof communicating the manifold passageway with the flow space of the sleeve, and a plurality of flow orifices through the surface thereof for the flow of thermoplastic material, the flow of thermoplastic material regulated by communication of varying portions of the main sleeve orifices with the conduit orifices by axial positioning of the sleeve.

12. The system of claim 11 wherein:
(a) the conduit orifices are circumferentially disposed about the conduit; and
(b) the sleeve orifices are circumferentially disposed about the sleeve.

13. The system of claim 11 wherein the sleeve moving means comprises:
(a) a housing positioned at one end of the sleeve; and
(b) a member threadably engaged by the housing, the member engaging one end of the sleeve such that rotation of the member within the housing causes axial movement of the sleeve.

14. The system of claim 11 wherein:
(a) the main port of the inlet manifold and the main port of the discharge manifold are centrally disposed within their respective manifolds; and
(b) the inlet distribution ports and the discharge distribution ports are radially disposed from the main port of the inlet manifold and the main port of the discharge manifold respectively.

* * * * *